(12) United States Patent
White et al.

(10) Patent No.: US 9,751,522 B2
(45) Date of Patent: Sep. 5, 2017

(54) METHOD AND SYSTEM FOR CONTROLLING A HYBRID VEHICLE

(71) Applicant: GM GLOBAL TECHNOLOGY OPERATIONS LLC, Detroit, MI (US)

(72) Inventors: Marsella L. White, Howell, MI (US); Michael G. Petrucci, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/090,035

(22) Filed: Apr. 4, 2016

(65) Prior Publication Data
US 2017/0072938 A1    Mar. 16, 2017

Related U.S. Application Data

(60) Provisional application No. 62/217,851, filed on Sep. 12, 2015.

(51) Int. Cl.
*B60W 20/13* (2016.01)
*B60W 30/182* (2012.01)
*B60W 40/10* (2012.01)

(52) U.S. Cl.
CPC .......... *B60W 20/13* (2016.01); *B60W 30/182* (2013.01); *B60W 40/10* (2013.01); *B60W 2520/105* (2013.01); *B60W 2520/125* (2013.01)

(58) Field of Classification Search
CPC ..... B60W 20/13; B60W 30/182; B60W 40/10
USPC ......................................................... 701/22
See application file for complete search history.

(56) References Cited

U.S. PATENT DOCUMENTS

2016/0185337 A1* 6/2016 Morita ................. B60W 20/10
                                                              701/22

* cited by examiner

*Primary Examiner* — Yazan Soofi
(74) *Attorney, Agent, or Firm* — Quinn IP Law

(57) ABSTRACT

A method for controlling a hybrid vehicle includes the following steps: (a) monitoring, via a controller, a magnitude and direction of a lateral acceleration, longitudinal acceleration, and longitudinal deceleration of the hybrid vehicle; (b) determining, via the controller, vehicle operating conditions in which a hybrid powertrain is allowed to operate in a regenerative state based, at least in part, on the magnitude and direction of the lateral acceleration, longitudinal acceleration, and longitudinal deceleration of the hybrid vehicle; and (c) commanding, via the controller, the hybrid powertrain to operate in the regenerative state when the hybrid vehicle is operating in the determined vehicle operating conditions. The vehicle operating conditions depend, at least in part, on operator commands and the current SOC of the energy storage system.

18 Claims, 3 Drawing Sheets

METHOD AND SYSTEM FOR CONTROLLING A HYBRID VEHICLE

CROSS-REFERENCE TO RELATED APPLICATION

This application claims priority to, and the benefit of, U.S. Provisional Patent Application No. 62/217,851, filed on Sep. 12, 2015, which is hereby incorporated by reference in its entirety.

TECHNICAL FIELD

The present disclosure relates to methods and systems for controlling hybrid vehicles and powertrains.

BACKGROUND

Hybrid vehicle powertrains include internal combustion engines and electric motor/generators. Electric motor/generators are supplied electric power from high-voltage energy storage systems. In certain circumstances, the electric motor/generators operate as generators and supply electric power to high-voltage energy storage systems.

SUMMARY

The present disclosure describes hybrid powertrains capable of employing regenerative control systems and methods to recover electric power for charging a high-voltage energy storage system based on operator commands, the current state of charge (SOC) of the high-voltage energy storage system, and vehicle dynamics status. By employing the presently disclosed regenerative control method, the hybrid powertrain can maximize energy regeneration in the electric storage system in performance-oriented hybrid vehicles or non-performance oriented vehicles. To do so, the presently disclosed method allows the hybrid vehicle and the hybrid powertrain to operate in a regenerative state in different vehicle dynamic conditions.

The presently disclosed hybrid powertrain is part of a hybrid vehicle and includes an energy storage system, a driveline, an internal combustion engine coupled to (or uncoupled from) the driveline, and an electric machine electrically connected to the energy storage system. The present disclosure also describes methods to control the hybrid vehicle in order to regulate when the hybrid powertrain operates in a regenerative state. When the hybrid powertrain operates in the regenerative state, torque is transferred from the driveline (or another rotating vehicle component) to the electric machine, the electric machine operates as a generator in order to convert kinetic energy received from the driveline (or another rotating vehicle component) into electric energy, and the electric machine transmits the electric energy to the energy storage system.

In one embodiment, the presently disclosed method entails monitoring, via a controller, the vehicle dynamic state. For example, the controller can monitor a magnitude and direction of a hybrid vehicle longitudinal acceleration, longitudinal deceleration, lateral acceleration and lateral acceleration. In this method, other signals may be monitored, such as yaw rate, wheel speeds, vehicle speed, among others. The method also entails determining, via the controller, vehicle operating conditions in which the hybrid powertrain is allowed to operate in a regenerative state based on the vehicle dynamic state. The vehicle dynamic state includes, but is not limited to, the magnitude and direction of the lateral acceleration, longitudinal acceleration, and longitudinal deceleration of the hybrid vehicle. The method also entails commanding, via the controller, the hybrid powertrain to operate in the regenerative state when the hybrid vehicle is operating in the determined vehicle operating conditions. The vehicle operating conditions depend, at least in part, on operator commands and the current SOC of the energy storage system.

The above features and advantages and other features and advantages of the present teachings are readily apparent from the following detailed description of the best modes for carrying out the teachings when taken in connection with the accompanying drawings.

DETAILED DESCRIPTION

Figure 1:
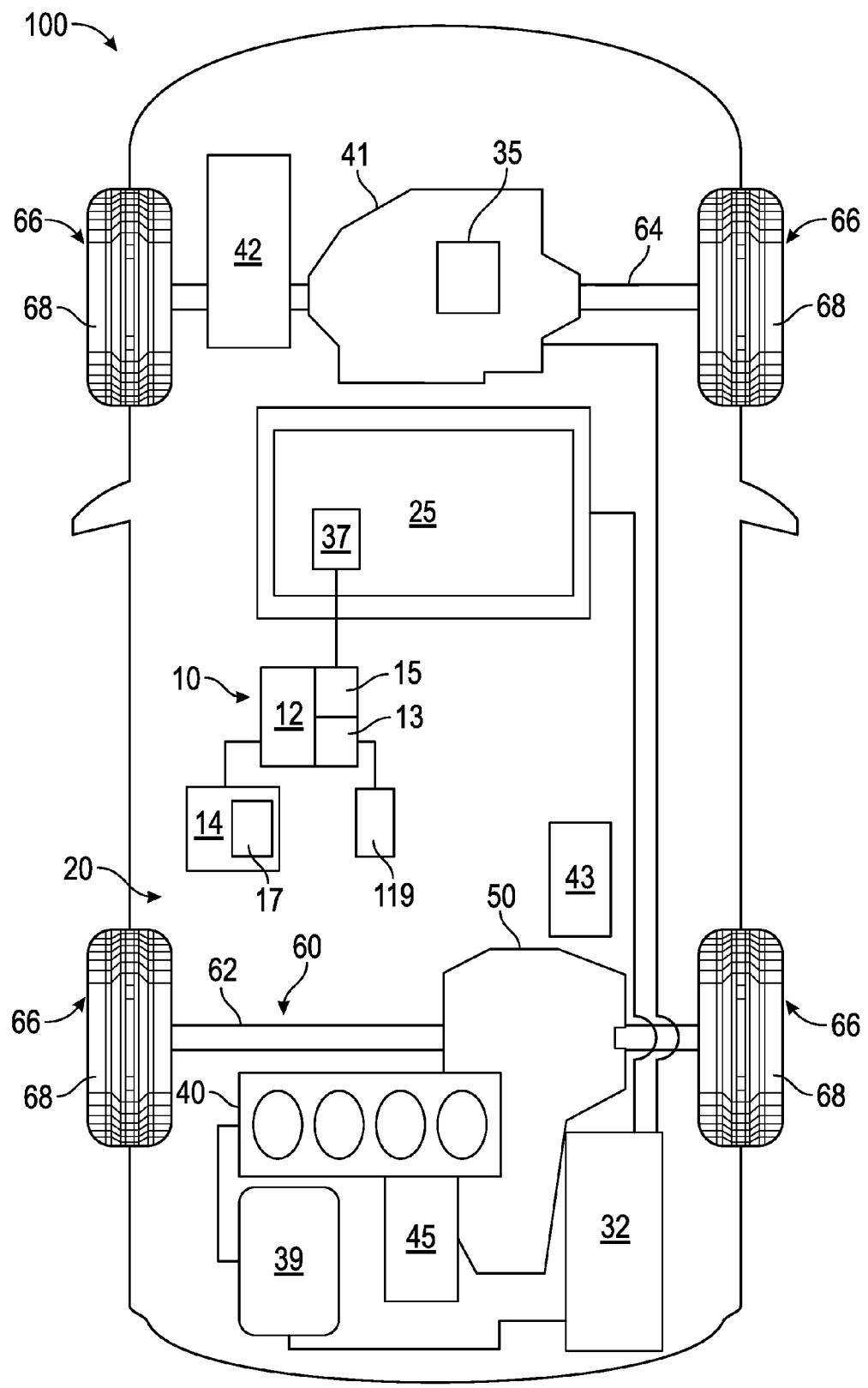
FIG. 1 is a schematic illustration of a vehicle in accordance with an embodiment of the present disclosure.

Referring now to the drawings, wherein the showings are for the purpose of illustrating certain exemplary embodiments only and not for the purpose of limiting the same, FIG. 1 schematically shows a hybrid vehicle 100 including a hybrid powertrain 20 coupled to a driveline 60 and controlled by a control system 10. Like numerals refer to like elements throughout the description. The hybrid powertrain 20 is illustrative, and the concepts described herein apply to other powertrains that are similarly configured.

The driveline 60 includes a first or rear axle 62 and a second or front axle 64. Each of the first axle 62 and second axle 64 may be mechanically coupled or decoupled to at least one tire/wheel assembly 66. Each tire/wheel assembly 66 includes a tire 68 configured to contact the road surface. In the depicted embodiment, the first axle 62 is mechanically coupled to two rear tire/wheel assemblies 66, and the second axle 64 is mechanically coupled to two rear tire/wheel assemblies 66. The first axle 62 is mechanically decoupled from the second axle 64. Therefore, each first axle 62 and second axle 64 may be driven independently from each other. Accordingly, the hybrid vehicle 100 may be an all-wheel drive (AWD) vehicle.

The hybrid powertrain 20 includes multiple torque-generating devices including an internal combustion engine 40 and at least one electric machine 35. During operation, the internal combustion engine 40 can combust fuel, such as gasoline, in order to propel the hybrid vehicle 100. For example, the internal combustion engine 40 may be a multi-cylinder internal combustion engine that converts fuel to mechanical torque through a thermodynamic combustion process. The internal combustion engine 40 can transfer torque through a transmission 50 to the first axle 62 of the driveline 60. In the depicted embodiment, the hybrid powertrain 20 includes a belt-alternator-starter (BAS) system 39 mechanically coupled to the internal combustion engine 40. The BAS system is electrically powered and can be used to start the internal combustion engine 40.

In depicted embodiment, the electric machine 35 is mechanically coupled to the second axle 64 of the hybrid vehicle 100 and mechanically decoupled from the first axle 62 and the internal combustion engine 40. In this embodiment, torque is transferred between the first axle 62 and the front axle 64 of the hybrid vehicle 100 only through the road. The concepts described herein may apply to any suitable powertrain configuration that includes the internal combustion engine 40 and the electric machine 35.

The electric machine 35 may be a high-voltage multi-phase electric motor/generator configured to operate as a motor or as a generator. When operating as a motor, the electric machine 35 converts stored electric energy into to kinetic energy (i.e., torque). When operating as a generator, the electric machine 35 converts kinetic energy (e.g., torque) into electric energy that may be stored in a high-voltage energy storage system 25 (e.g., battery or battery pack). The energy storage system 25 may be any high-voltage energy storage device, e.g., a multi-cell lithium ion device, an ultra-capacitor, or another suitable device without limitation. Monitored parameters related to the energy storage system 25 include a state of charge (SOC), temperature, and others. In the depicted embodiment, the hybrid vehicle 100 further includes SOC sensor 37 operatively coupled to the energy storage system 25. The SOC sensor 37 can measure and monitor the SOC of the energy storage system 25. The electric machine 35 can be part of an eAWD unit 41 configured to drive the second axle 64 with electric energy from the energy storage system 25. The hybrid vehicle 100 may also include an auxiliary power module (APM) 42 to provide power flow between the vehicle high voltage and low voltage DC bus of the hybrid vehicle 100, and an auxiliary power system 43 to provide low-voltage electric power to low-voltage systems 45 on the vehicle, including, e.g., electric windows, HVAC fans, seats, and other devices.

In one embodiment, the energy storage system 25 may electrically connect via an on-vehicle battery charger to a remote, off-vehicle electric power source for charging while the hybrid vehicle 100 is stationary. The energy storage system 25 electrically connects to an inverter module 32 via a high-voltage DC bus to transfer high-voltage DC electric power via three-phase conductors to the electric machine 35 in response to control signals originating in a control system 10. The electric machine 35 includes a rotor and a stator, and electrically connects via the inverter module 32 and the high-voltage bus to the energy storage system 25. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 may employ pulsewidth-modulating (PWM) control of the IGBTs to convert stored DC electric power originating in the high-voltage energy storage system 25 to AC electric power to drive the electric machine 35 to generate torque. Similarly, the inverter module 32 converts mechanical power transferred to the electric machine 35 to DC electric power to generate electric energy that is storable in the energy storage system 25, including as part of a regenerative control strategy. The inverter module 32 receives motor control commands and controls inverter states to provide the motor drive and regenerative braking functionality.

The transmission 50 may be arranged in a step-gear configuration in one embodiment, and may include one or more differential gear sets and activatable clutches configured to effect torque transfer in one of a plurality of fixed gear states over a range of speed ratios. It is contemplated that the transmission 50 may be an automatic transmission that automatically shifts between the fixed gear states. Alternatively, the transmission 50 may be a continuously variable transmission or any other suitable transmission.

The control system 10 includes a controller 12 that signally connects to an user interface 14. In the present disclosure, the controller 12 includes at least one processor 13 and at least one associated non-transitory memory 15 and can receive signals from vehicle sensors, such as the SOC sensor 37. The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory 15 in the form of memory and storage devices (read only, programmable read only, random access, hard drive, etc.). The non-transitory memory 15 is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, for example each 100 microseconds or 3.125, 6.25, 12.5, 25 and 100 milliseconds during ongoing operation. Alternatively, routines may be executed in response to occurrence of a triggering event. Communication between controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The SOC sensor 37 is in electric communication with the controller 12 and can therefore transmit a signal indicative of the current SOC of the energy storage system 25 to the controller 12. The hybrid vehicle 100 may also include at least one inertial sensor 119, such as an accelerometer or an inertial measurement unit, for measuring and monitoring the magnitude and direction of the lateral acceleration, longitudinal acceleration, and longitudinal deceleration of the hybrid vehicle 100. The SOC sensor 37 can generate a signal indicative of the vehicle acceleration (i.e., magnitude and direction). The controller 12 can receive signals from the SOC sensor 37, the inertial sensor 119, and other sensors. The controller 12 communicates with each of the inverter module 32, the internal combustion engine 40, and the electric machine 35 directly or via a communications bus to monitor operation and control operations thereof.

The user interface 14 of the hybrid vehicle 100 includes a plurality of human/machine interface devices through which the vehicle operator commands operation of the hybrid vehicle 100, including, e.g., an ignition switch to enable an operator to crank and start the internal combustion engine 40, an accelerator pedal, a brake pedal, a transmission range selector (PRNDL), a steering wheel, a headlamp switch, and an input device 17, such as a touchscreen, buttons, or any other device suitable to receive an input from a vehicle operator (e.g., driver). In the depicted embodiment, the vehicle operator (e.g., driver) can select a vehicle operating mode through the input device 17. For example, the vehicle occupant can select among a quick charge mode, a charge deplete mode, or a track mode as described below. The accelerator pedal provides signal input including an accelerator pedal position indicating an operator request for vehicle acceleration, and the brake pedal provides signal input including a brake pedal position indicating an operator request for vehicle braking. The steering wheel provides an indication of the lateral acceleration of the hybrid vehicle 100. The transmission range selector provides signal input indicating direction of operator-intended motion of the vehicle including a discrete number of operator-selectable positions.

The hybrid powertrain 20 and hybrid vehicle 100 can also operate in a charge-sustaining mode. In the charge-sustaining mode, most or all of the power used by the hybrid powertrain 20 to propel the hybrid vehicle 100 originates from the internal combustion engine 40. Therefore, the electrical energy stored in the energy storage system 25 is not significantly depleted when the hybrid powertrain 20 operates in the charge-sustaining mode. In the charge-depletion mode, most or all of the power used by the hybrid powertrain 20 to propel the hybrid vehicle 100 originates from the electric machine 35. Accordingly, when the hybrid powertrain 20 operates in the charge-depletion mode, the electric energy stored in the energy storage system 25 is depleted. In the blended mode, the hybrid powertrain 20 uses power from the internal combustion engine 40 and the electric machine 35 to propel the hybrid vehicle 100.

Figure 3:
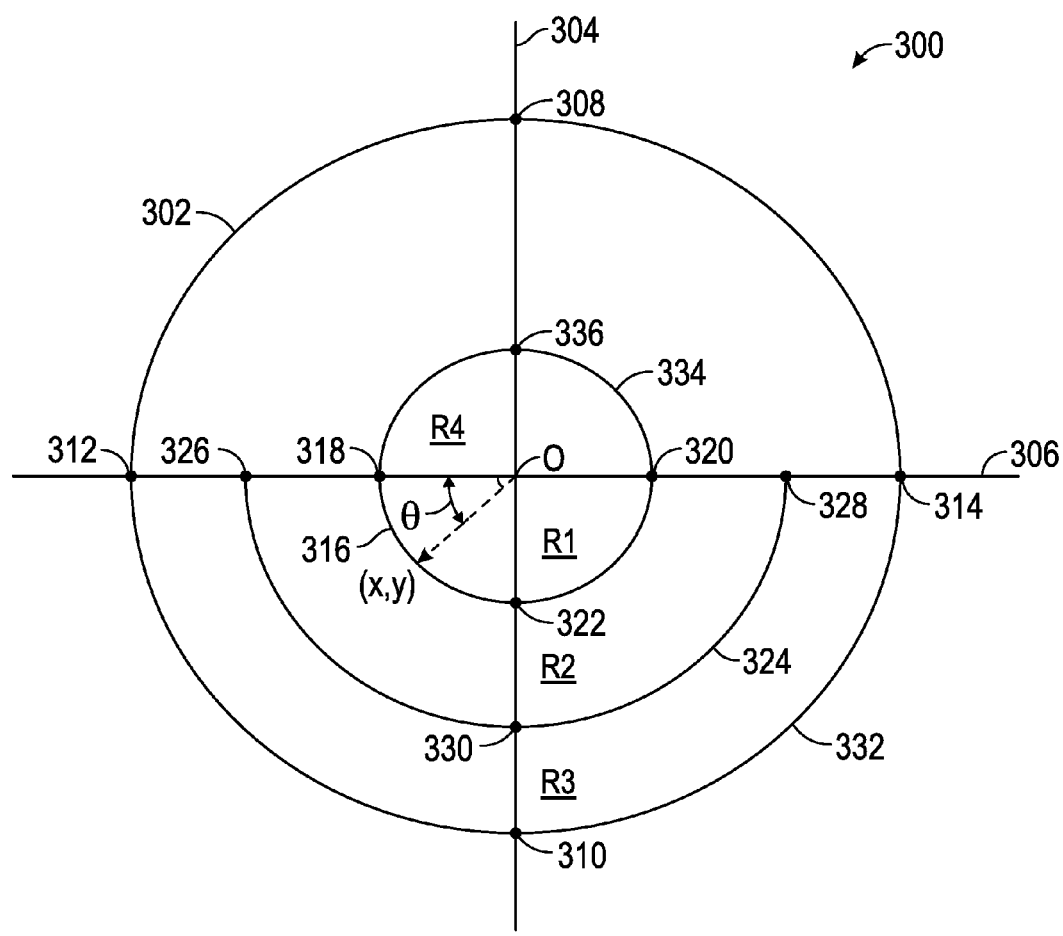
FIG. 3 is a schematic illustration of a friction circle graphically illustrating the traction of a tire of the hybrid vehicle shown in FIG. 1.

With reference to FIGS. 3 and 4, the controller 12 is specifically programmed to execute the presently disclosed method 200 in order to maximize energy regeneration in the electric storage system 25 in performance-oriented hybrid vehicles 100 or non-performance oriented vehicles. To do so, the presently disclosed method 200 allows the hybrid vehicle 100 and the hybrid powertrain 20 to operate in a regenerative state in different vehicle dynamic regions shown in FIG. 3. The vehicle dynamic regions shown in FIG. 3 may also be referred to as vehicle operating conditions. When the hybrid powertrain 20 operates in the regenerative state, torque is transferred from the driveline 60 (e.g., the front tire/wheel assemblies 66 connected to the second axle 64) to the electric machine 35, and the electric machine 35 operates as a generator in order to convert kinetic energy (in the form of torque) received from the driveline 60 into electric energy. Further, when the hybrid powertrain 20 operates in the regenerative state, the electric machine 35 transmits the generated electric energy to the energy storage system 25.

When the hybrid vehicle 100 is driven in a sporty and/or racetrack fashion, the rate of energy depletion in the electric machine 35 may exceed the rate of replenishment capability under conventional driving conditions. It is therefore desirable to maximize the vehicle dynamic regions (i.e., vehicle operating conditions) in which the hybrid powertrain 20 can operate in the regenerative state in order to maintain the SOC of the energy storage system 25 above or at least equal to a predetermined target SOC. The predetermined target SOC energy storage system 25 may be, for example, fifty percent. However, when the hybrid vehicle 100 is operated in a sporty and/or racetrack fashion, the predetermined target SOC of the energy storage system 25 may be higher (e.g., seventy percent) than when the hybrid vehicle 100 is not being operated in a sporty and/or racetrack fashion.

FIG. 3 is a friction circle (or friction ellipse) 300 graphically illustrating the dynamic interaction between the tire 68 and the road surface based on vehicle acceleration. Specifically, the outermost boundary 302 of the friction circle 300 represents the maximum traction of the tire 68 based on lateral acceleration, and longitudinal acceleration of the hybrid vehicle 100. In other words, the outermost boundary 302 of the friction circle 300 represents the adhesion limits between the road surface and the tire 68 as a function of lateral acceleration, longitudinal deceleration, and longitudinal acceleration of the hybrid vehicle 100. The first or vertical axis 304 represents longitudinal vehicle acceleration and longitudinal vehicle deceleration. Specifically, positive values on the first axis 304 represent longitudinal acceleration, and negative values on the first axis 304 represent longitudinal deceleration. The second or horizontal axis 306 represents lateral acceleration. In the depicted friction circle 300, negative values of the lateral acceleration represent acceleration to the left of the hybrid vehicle 100, and positive values of the lateral acceleration represent acceleration to the right of the hybrid vehicle 100. In the origin O of the friction circle 300, the vehicle is not accelerating laterally or longitudinally. The uppermost data point 308 represents the maximum longitudinal acceleration, and the lowermost data point 310 represents the maximum longitudinal deceleration. The leftmost data point 312 and the rightmost data point 314 of the outermost boundary 302 represent the maximum left and right lateral acceleration, respectively.

The friction circle 300 illustrates a plurality of vehicle dynamic regions in which the hybrid vehicle 100 is allowed to operate in the regenerative state. The vehicle dynamic regions may also be referred to as vehicle operating conditions. Although the drawings show a friction circle 300 with four vehicle dynamic regions, it is contemplated that the friction circle 300 may include more or fewer vehicle dynamic regions. The first vehicle dynamic region R1 in the friction circle 300 has an outer boundary (referred as the first boundary 316) and an inner boundary defined by the horizontal axis 306. Moreover, the first vehicle dynamic region R1 only includes lateral (left and right) acceleration and longitudinal deceleration but does not include longitudinal acceleration. The leftmost data point 318 of the first dynamic region R1 illustrates the maximum purely lateral acceleration (to the left) in the first vehicle dynamic region R1. In one exemplary embodiment, the leftmost data point 318 of the first dynamic region R1 may be about twenty percent (20%) of the maximum purely lateral acceleration (illustrated by the leftmost data point 312 of the outermost boundary 302). The rightmost data point 320 of the first dynamic region R1 illustrates the maximum purely lateral acceleration (to the right) in the first vehicle dynamic region R1. In one exemplary embodiment, the rightmost data point 320 of the first dynamic region R1 may be about twenty percent (20%) of the maximum purely lateral acceleration (illustrated by the rightmost data point 314 of the outermost boundary 302). The lowermost data point 322 of the first dynamic region R1 illustrates the maximum purely longitudinal deceleration in the first dynamic region R1. In one exemplary embodiment, the lowermost data point 322 of the first dynamic region R1 may be about thirty percent (30%) of the maximum purely longitudinal deceleration (illustrated by the lowermost data point 310 of the outermost boundary 302). The percentages described above may be other values depending on the vehicle characteristics. If the first vehicle dynamic region R1 has a semi-elliptical shape, the data points of the curved portion of the first boundary 316 may be determined using the parametric equations of an ellipse, as follows:

$$x = a \cdot \cos \theta;\text{ and}$$

$$y = b \cdot \sin \theta.$$

where:
x is a horizontal coordinate as shown in FIG. 3;
y is a vertical coordinate as shown in FIG. 3;
a is maximum purely lateral acceleration (e.g., leftmost data point 318) of a vehicle dynamic region;
b is a maximum purely longitudinal deceleration (e.g., lowermost data point 322) of a vehicle dynamic region; and
θ is a slip angle of the vehicle as shown in FIG. 3.

The friction circle 300 also has a second vehicle dynamic region R2 in which the hybrid vehicle 100 is allowed to operate in the regenerative state depending, among other things, on the current SOC of the energy storage system 25 and operator-selectable vehicle operating modes (e.g., quick charge mode, charge deplete mode, and the track mode) as discussed below. The second vehicle dynamic region R2 in the friction circle 300 has an outer boundary (referred as the second boundary 324) and an inner boundary defined by the first boundary 316 of the first dynamic region R1. In the depicted embodiment, the second vehicle dynamic region R2 only includes lateral (left and right) acceleration and longitudinal deceleration but does not include longitudinal acceleration. The leftmost data point 326 of the second dynamic region R2 illustrates the maximum purely lateral acceleration (to the left) in the second vehicle dynamic region R2. In one exemplary embodiment, the leftmost data point 326 of the second dynamic region R2 may be about fifty percent (50%) of the maximum purely lateral acceleration (illustrated by the leftmost data point 312 of the outermost boundary 302). The rightmost data point 328 of the second dynamic region R2 illustrates the maximum purely lateral acceleration (to the right) in the second vehicle dynamic region R2. In one exemplary embodiment, the rightmost data point 328 of the second dynamic region R2 may be about twenty percent (50%) of the maximum purely lateral acceleration (illustrated by the rightmost data point 314 of the outermost boundary 302). The lowermost data point 330 of the second dynamic region R2 illustrates the maximum purely longitudinal deceleration in the second dynamic region R2. In one exemplary embodiment, the lowermost data point 330 of the second dynamic region R2 may be about sixty percent (60%) of the maximum purely longitudinal deceleration (illustrated by the lowermost data point 310 of the outermost boundary 302). If the second vehicle dynamic region R2 has a substantially semi-elliptical shape (except for the area defined by the first dynamic region R1), the data points of the second boundary 324 may be determined using the parametric equations of an ellipse as described above with respect to the first dynamic region R1.

The friction circle 300 also has a third vehicle dynamic region R3 in which the hybrid vehicle 100 is allowed to operate in the regenerative state depending, among other things, on the current SOC of the energy storage system 25 and operator-selectable vehicle operating modes (e.g., quick charge mode, charge deplete mode, and the track mode) as discussed below. The third vehicle dynamic region R3 in the friction circle 300 has an outer boundary (referred as the third boundary 332) and an inner boundary defined by the second boundary 324 of the second dynamic region R2. The third boundary 332 coincides with parts of the outermost boundary 302 of the friction circle 300. In the depicted embodiment, the third vehicle dynamic region R3 only includes lateral (left and right) acceleration and longitudinal deceleration but does not include longitudinal acceleration. The leftmost data point, lowermost data point, and the rightmost data point of the third dynamic region R3 coincide with the leftmost data point 312, the lowermost data point 310, and the rightmost data point 314 defined by the outermost boundary 302, respectively. If the third vehicle dynamic region R3 has a substantially semi-elliptical shape (except for the area defined by the first dynamic region R1 and the second dynamic region R2), the data points of the third boundary 332 may be determined using the parametric equations of an ellipse as described above with respect to the first dynamic region R1.

The friction circle 300 also has a fourth vehicle dynamic region R4 in which the hybrid vehicle 100 is allowed to operate in the regenerative state depending, among other things, on the current SOC of the energy storage system 25 and operator-selectable vehicle operating modes (e.g., quick charge mode, charge deplete mode, and the track mode) as discussed below. The fourth vehicle dynamic region R4 in the friction circle 300 has an outer boundary (referred as the fourth boundary 334) and an inner boundary defined by the horizontal axis 306. In the depicted embodiment, the fourth vehicle dynamic region R4 only includes lateral (left and right) acceleration and longitudinal acceleration but does not include longitudinal deceleration. The leftmost data point and the rightmost data point of the fourth dynamic region R4 coincide with the leftmost data point 318 and the rightmost data point 320 of the first dynamic region R1, respectively. The uppermost data point 336 of the fourth dynamic region R4 illustrates the maximum purely longitudinal acceleration in the fourth dynamic region R4. If the fourth vehicle dynamic region R4 has a substantially semi-elliptical shape, the data points of the fourth boundary 334 may be determined using the parametric equations of an ellipse as described above with respect to the first dynamic region R1.

By executing the method 200, the controller 12 determines in which vehicle dynamic regions (i.e., the first, second, third, and fourth vehicle dynamic regions R1, R2, R3, and R4) the hybrid powertrain 20 is allowed to operate in the regenerative state. As discussed above, the friction circle 300 may have more or fewer vehicle dynamic regions. The method begins with step 202. At step 202, the controller 12 receives an input from, for example, the user interface 14. This input may be a vehicle mode selection. The vehicle mode selection may be EV specific or not EV specific. Not EV specific selected by the vehicle operator may include, but are not limited to, tour mode, sports mode, track mode, weather-related mode. EV specific modes selected by the vehicle operator include, but are not limited to, the quick charge mode and the charge deplete mode. In the quick charge mode, the hybrid powertrain 20 operates in the regenerative state to quickly charge the energy storage system 25. To do so, in the quick charge mode, the hybrid powertrain 20 maximizes the vehicle dynamic regions in which regenerative state is allowed by the controller 12. In the charge deplete mode, the hybrid powertrain 20 may operate in the regenerative state, but the controller 12 limits (in comparison with the quick charge mode) the vehicle dynamic regions in which the regenerative state is allowed. In the track mode, the controller 12 limits even more (in comparison with the quick charge mode) the vehicle dynamic regions in which the regenerative state is allowed. The input is not necessarily selected by the vehicle operator. For example, the input may be a track detected input. After the controller 12 receives the vehicle mode selection input, the method 200 proceeds to step 204.

At step 204, the controller 12 determines and monitors the magnitude and direction of the lateral acceleration, longitudinal acceleration, and longitudinal deceleration of the hybrid vehicle 100. To do so, the controller 12 can constantly receive signals from the inertial sensor 119. Alternatively, the controller 12 can determine the magnitude and direction of the lateral acceleration, longitudinal acceleration, and longitudinal deceleration of the hybrid vehicle 100 based on a vehicle model that receives inputs from other sensors and/or components, such as the steering torque, the wheel speed, the drive axle torque, as well as other vehicle dynamic measurements. Then, the method 200 proceeds to step 206.

At step 206, the controller 12 monitors and determines the current SOC of the energy storage system 25, which may also be referred to as the actual SOC. The controller 12 can determine the current SOC of the energy storage system 25 based, for example, on signals receives from the SOC sensor 37. Next, the method 200 continues to step 208.

At step 208, the controller 12 determines the target SOC of the energy storage system 25. The target SOC of the energy storage system 25 is predetermined and may be a nominal value, such as fifty percent (50%). When the vehicle operator selects the track mode, or when a racetrack vehicle operation is detected as described below, the target SOC of the energy storage system 25 may be higher that the nominal value, such as seventy percent (70%). Then, the method 200 continues to step 210.

At step 210, the controller 12 determines whether the hybrid vehicle 100 is being operated in a racetrack fashion (e.g., on a racetrack). The controller 12 may determine whether the hybrid vehicle 100 is being operated on a racetrack or in a racetrack fashion based, at least in part, on the vehicle speed and the vehicle lateral acceleration. For example, the controller 12 may determine that the hybrid vehicle 100 is being operated in a racetrack fashion when the vehicle speed is greater than a speed threshold and the magnitude of the lateral acceleration is greater than an acceleration threshold. The controller 12 may also employ an iterative process in which it considers, for example, how many times, within a predetermined time period, the vehicle speed is greater than the speed threshold and how many times the magnitude of the lateral acceleration is greater than the acceleration threshold. Steps 202, 204, 206, 208, and 210 may be executed in any chronological order or simultaneously. Then, the method 200 continues to step 212.

At step 212, the controller 12 determines whether the quick charge mode has been selected by the vehicle occupant based on the input received from the user interface 14 at step 202. If the quick charge mode has been selected, then the method 200 proceeds to step 214. On the other hand, if the quick charge mode has not been selected, the method 200 continues to step 216.

At step 214, the controller 12 enables the hybrid powertrain 20 to operate in the regenerative state in the first, second, third, and fourth vehicle dynamic regions R1, R2, R3, and R4 identified in the friction circle 300 in order to quickly charge the energy storage system 25 during acceleration and/or deceleration of the hybrid vehicle 100. In other words, the controller 12 allows the hybrid powertrain 20 to operate in the regenerative state only when the hybrid vehicle 100 is operating in one of the first, second, third, and fourth vehicle dynamic regions R1, R2, R3, and R4. As discussed above, when the hybrid powertrain 20 operates in the regenerative state, the electric machine 35 operates as a generator in order to convert kinetic energy (in the form of torque) received from the driveline 60 into electric energy, and transmits the generated electric energy to the energy storage system 25. At step 214, the controller 12 can also command the hybrid powertrain 20 to operate in the regenerative state only if the hybrid vehicle 100 is operating in the first, second, third, or fourth vehicle dynamic region R1, R2, R3, and R4. To do so, the controller 12 determines whether the hybrid vehicle 100 is operating in the first, second, third, or fourth vehicle dynamic region R1, R2, R3, and R4 based on the magnitude and direction of the lateral acceleration, longitudinal acceleration, and longitudinal deceleration of the hybrid vehicle 100 as determined in step 204.

The controller 12 executes step 216 if the quick charge mode has not been selected by the vehicle occupant. At step 216, the controller 12 calculates the difference between the predetermined target SOC, as determined in step 208, and the current SOC of the energy storage system 25, as determined at step 206. To calculate this difference, the controller 12 subtracts the current SOC of the energy storage system 25 from the predetermined target SOC. Then, the controller 12 compares the difference between the predetermined target SOC and the current SOC of the energy storage system 25 with a first predetermined threshold in order to determine if the calculated difference is greater than the first predetermined threshold. If the calculated difference is greater than the first predetermined threshold, then the method 200 proceeds to step 218. If the calculated difference is not greater than the first predetermined threshold, then the method 200 proceeds to step 220.

At step 218, the controller 12 limits the operation of the regenerative state to the first, second, and third vehicle dynamic regions R1, R2, and R3 identified in the friction circle 300. In other words, the controller 12 allows the hybrid powertrain 20 to operate in the regenerative state only when the hybrid vehicle 100 is operating in one of the first, second, and third vehicle dynamic regions R1, R2, and R3. At step 218, the controller 12 can also command the hybrid powertrain 20 to operate in the regenerative state only if the hybrid vehicle 100 is operating in the first, second, or third vehicle dynamic regions R1, R2, and R3. To do so, the controller 12 determines whether the hybrid vehicle 100 is operating in the first, second, third, or fourth vehicle dynamic region R1, R2, and R3 based on the magnitude and direction of the lateral acceleration, longitudinal acceleration, and longitudinal deceleration of the hybrid vehicle 100 as determined in step 204.

As discussed above, the controller 12 executes step 220 if the calculated difference between the predetermined target SOC and the current SOC of the energy storage system 25 is not greater than the first predetermined threshold. At step 220, the controller 12 determines whether the charge deplete mode has been selected by the vehicle operator based on the input received from the user interface 14. Furthermore, at step 220, the controller 12 compares the calculated difference between the predetermined target SOC and the current SOC of the energy storage system 25 with the first predetermined threshold and a second predetermined threshold in order to determine whether the following conditions exists, namely: (a) if the calculated difference is less than the first predetermined threshold; and (b) if the calculated difference is greater than the second predetermined threshold. The first predetermined threshold is greater than the second predetermined threshold in order to maximize electric energy regeneration in the quick charge mode. If both of these conditions exist or the charge deplete mode has been selected, then the controller 12 executes step 222. Otherwise, the controller 12 executes step 224.

At step 222, the controller 12 limits the operation of the regenerative state to the first and second vehicle dynamic regions R1 and R2 identified in the friction circle 300. In other words, the controller 12 allows the hybrid powertrain 20 to operate in the regenerative state only when the hybrid vehicle 100 is operating in one of the first and second vehicle dynamic regions R1 and R2. At step 222, the controller 12 can also command the hybrid powertrain 20 to operate in the regenerative state only if the hybrid vehicle 100 is operating in the first or second vehicle dynamic region R1, R2. To do so, the controller 12 determines whether the hybrid vehicle 100 is operating in the first or second vehicle dynamic region R1, R2 based on the magnitude and direction of the lateral acceleration, longitudinal acceleration, and longitudinal deceleration of the hybrid vehicle 100, as determined in step 204.

As discussed above, if the conditions described in step 220 do not exist and the charge deplete mode has not been selected, then the controller 12 executes step 224. At step 224, the controller 12 compares the calculated difference between the predetermined target SOC and the current SOC of the energy storage system 25 with the second predetermined threshold in order to determine if the calculated difference is greater than the second predetermined threshold. If the calculated difference is greater than the second predetermined threshold, then the controller 12 executes step 226. If the calculated difference is not greater than the second predetermined threshold, then the controller 12 executes step 232.

At step 226, the controller 12 determines whether the track mode has been selected by the vehicle operator based on the input received from the user interface 14 at step 202 and whether the racetrack fashion vehicle operation has been detected in step 210. If the track mode has been selected or the racetrack vehicle operation has been detected, then the method 200 proceeds to step 228. On the other hand, if the track mode has not been selected and the racetrack fashion vehicle operation has not been detected, then the method 200 proceeds to step 230.

At step 228, the controller 12 limits the operation of the regenerative state to the first and second vehicle dynamic regions R1 and R2 identified in the friction circle 300. In other words, the controller 12 allows the hybrid powertrain 20 to operate in the regenerative state only when the hybrid vehicle 100 is operating in one of the first and second vehicle dynamic regions R1 and R2. At step 228, the controller 12 can also command the hybrid powertrain 20 to operate in the regenerative state only if the hybrid vehicle 100 is operating in the first or second vehicle dynamic region R1, R2. To do so, the controller 12 determines whether the hybrid vehicle 100 is operating in the first or second vehicle dynamic region R1, R2 based on the magnitude and direction of the lateral acceleration, longitudinal acceleration, and longitudinal deceleration of the hybrid vehicle, as determined in step 204.

As discussed above, if the track mode has not been selected and the racetrack fashion vehicle operation has not been detected, then the controller 12 executes step 230. At step 230, the controller 12 limits the operation of the regenerative state to the first vehicle dynamic region R1 identified in the friction circle 300. In other words, the controller 12 allows the hybrid powertrain 20 to operate in the regenerative state only when the hybrid vehicle 100 is operating in the first vehicle dynamic region R1. At step 230, the controller 12 can also command the hybrid powertrain 20 to operate in the regenerative state only if the hybrid vehicle 100 is operating in the first vehicle dynamic region R. To do so, the controller 12 determines whether the hybrid vehicle 100 is operating in the first vehicle dynamic region R1 based on the magnitude and direction of the lateral acceleration, longitudinal acceleration, and longitudinal deceleration of the hybrid vehicle 100, as determined in step 204.

As discussed above, if the calculated difference between the predetermined target SOC and the current SOC of the energy storage system 25 is not greater than the second predetermined threshold, then the controller 12 executes step 232. At step 232, the controller 12 determines that regeneration of the energy storage system 25 is not required. Accordingly, the controller 12 does not command the hybrid powertrain 20 to operate in the regenerative state.

Figure 2:
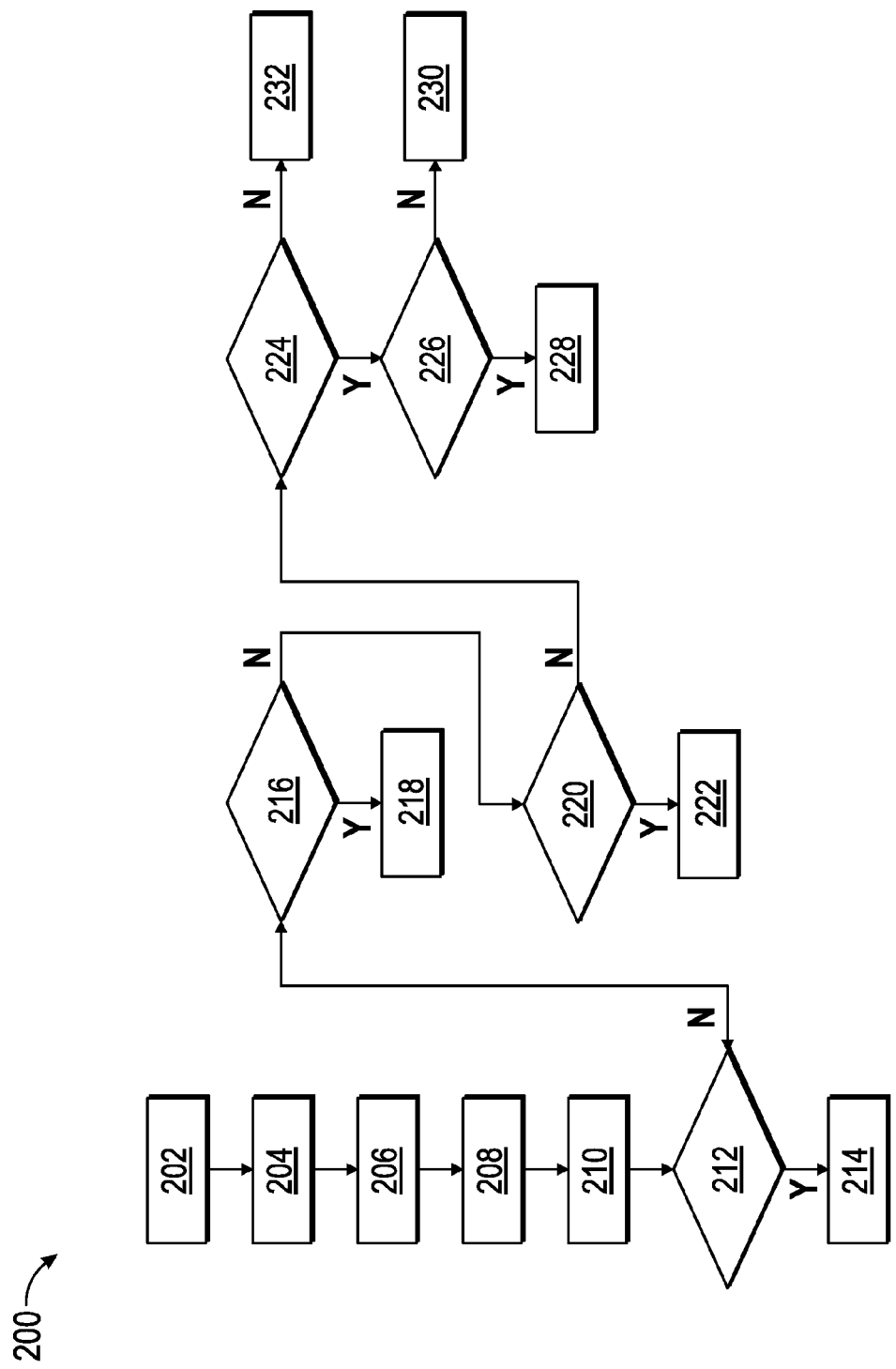
FIG. 2 is a flowchart illustrating a method for controlling the hybrid vehicle shown in FIG. 1.

While the best modes for carrying out the teachings have been described in detail, those familiar with the art to which this disclosure relates will recognize various alternative designs and embodiments for practicing the teachings within the scope of the appended claims. For example, the steps of the method 200 do not necessary have to be executed in the chronological order illustrated in FIG. 2. Further, some of the steps may be optional. The method 200 can also be used to store energy in a mechanical flywheel.

The invention claimed is:

1. A method of controlling a hybrid vehicle, the hybrid vehicle including a hybrid powertrain, the hybrid powertrain including an energy storage system, a driveline, an internal combustion engine, and an electric machine electrically connected to the energy storage system, the method comprising:

monitoring, via a controller, a magnitude and a direction of a lateral acceleration of the hybrid vehicle, a magnitude and a direction of a longitudinal acceleration of the hybrid vehicle, and a magnitude and a direction of a longitudinal deceleration of the hybrid vehicle;

determining, via the controller, vehicle operating conditions in which the hybrid powertrain is allowed to operate in a regenerative state based, at least in part, on the magnitude and the direction of the lateral acceleration of the hybrid vehicle, the magnitude and the direction of the longitudinal acceleration of the hybrid vehicle, and the magnitude and the direction of the longitudinal deceleration of the hybrid vehicle, wherein, when the hybrid powertrain operates in the regenerative state, torque is transferred from the driveline to the electric machine, the electric machine operates as a generator in order to convert kinetic energy received from the driveline into electric energy, and the electric machine transmits the electric energy to the energy storage system;

commanding, via the controller, the hybrid powertrain to operate in the regenerative state when the hybrid vehicle is operating under the determined vehicle operating conditions; and wherein determining vehicle operating conditions in which the hybrid powertrain is allowed to operate in the regenerative state is based, at least in part, on a vehicle operating mode selected by a vehicle operator; and wherein the vehicle operating mode is selected from a group consisting of a quick charge mode, a charge deplete mode, and a track mode.

2. The method of claim 1, wherein commanding the hybrid powertrain to operate in the regenerative state includes commanding the hybrid powertrain to operate in the regenerative state while the hybrid vehicle is accelerating only if the quick charge mode is selected by the vehicle operator.

3. The method of claim 2, further comprising receiving, via the controller, a signal indicative of the magnitude and the direction of the lateral acceleration, the magnitude and the direction of the longitudinal acceleration, and the magnitude and the direction of the longitudinal deceleration of the hybrid vehicle from an inertial sensor.

4. The method of claim 3, wherein determining vehicle operating conditions in which the hybrid powertrain is allowed to operate in the regenerative state is based on a current state of charge (SOC) of the energy storage system.

5. The method of claim 4, further comprising calculating, via the controller, a difference between a predetermined target SOC and the current SOC of the energy storage system.

6. The method of claim 5, further comprising comparing the difference between the predetermined target SOC and the current SOC of the energy storage system with a first predetermined threshold in order to determine if the difference between the predetermined target SOC and the current SOC of the energy storage system is greater than the first predetermined threshold.

7. The method of claim 6, wherein determining the vehicle operating conditions in which the hybrid powertrain is allowed to operate in the regenerative state is based, at least in part, on whether the difference between the predetermined target SOC and the current SOC of the energy storage system is greater than the first predetermined threshold.

8. The method of claim 7, further comprising comparing the difference between the predetermined target SOC and the current SOC of the energy storage system with a second predetermined threshold in order to determine if the difference between the predetermined target SOC and the current SOC of the energy storage system is greater than the second predetermined threshold, wherein the first predetermined threshold is greater than the second predetermined threshold.

9. The method of claim 8, wherein determining the vehicle operating conditions in which the hybrid powertrain is allowed to operate in the regenerative state is based, at least in part, on whether the difference between the predetermined target SOC and the current SOC of the energy storage system is greater than the second predetermined threshold.

10. The method of claim 9, further comprising determining, via the controller, whether the hybrid vehicle is being operated in a racetrack fashion based, at least in part, on a lateral acceleration and a speed of the hybrid vehicle.

11. The method of claim 10, wherein determining the vehicle operating conditions in which the hybrid powertrain is allowed to operate in the regenerative state is based, at least in part, on whether the hybrid vehicle is being operated in the racetrack fashion.

12. A hybrid vehicle, comprising:
a hybrid powertrain, wherein the hybrid powertrain includes an energy storage system, a driveline, an internal combustion engine, and an electric machine electrically connected to the energy storage system;
a controller in communication with the hybrid powertrain, wherein the controller is programmed to:
monitor a magnitude and a direction of a lateral acceleration of the hybrid vehicle, a magnitude and a direction of a longitudinal acceleration of the hybrid vehicle, and a magnitude and a direction of a longitudinal deceleration of the hybrid vehicle;
determine vehicle operating conditions in which the hybrid powertrain is allowed to operate in a regenerative state based, at least in part, on the magnitude and the direction of the lateral acceleration of the hybrid vehicle, the magnitude and the direction of the longitudinal acceleration of the hybrid vehicle, and the magnitude and the direction of the longitudinal deceleration of the hybrid vehicle, wherein, when the hybrid powertrain operates in the regenerative state, torque is transferred from the driveline to the electric machine, the electric machine operates as a generator in order to convert kinetic energy received from the driveline into electric energy, and the electric machine transmits the electric energy to the energy storage system;
command the hybrid powertrain to operate in the regenerative state when the hybrid vehicle is operating under the determined vehicle operating conditions; and
wherein the controller is programmed to determine vehicle operating conditions in which the hybrid powertrain is allowed to operate in the regenerative state based, at least in part, on a vehicle operating mode selected by a vehicle operator, and the vehicle operating mode is selected from a group consisting of a quick charge mode, a charge deplete mode, and a track mode.

13. The hybrid vehicle of claim 12, wherein the controller is programmed to command the hybrid powertrain to operate in the regenerative state while the hybrid vehicle is accelerating only if the quick charge mode is selected by the vehicle operator.

14. The hybrid vehicle of claim 13, wherein the controller is programmed to receive a signal indicative of the magnitude and the direction of the lateral acceleration of the hybrid vehicle, the magnitude and the direction of the longitudinal acceleration of the hybrid vehicle, and the magnitude and the direction of the longitudinal deceleration of the hybrid vehicle from an inertial sensor.

15. The hybrid vehicle of claim 14, wherein the controller is programmed to determine vehicle operating conditions in which the hybrid powertrain is allowed to operate in the regenerative state based on a current state of charge (SOC) of the energy storage system.

16. The hybrid vehicle of claim 15, wherein the controller is programmed to calculate a difference between a predetermined target SOC and the current SOC of the energy storage system.

17. The hybrid vehicle of claim 16, wherein the controller is programmed to compare the difference between the predetermined target SOC and the current SOC of the energy storage system with a first predetermined threshold in order to determine if the difference between the predetermined target SOC and the current SOC of the energy storage system is greater than the first predetermined threshold.

18. The hybrid vehicle of claim 17, wherein the controller is programmed to determine the vehicle operating conditions in which the hybrid powertrain is allowed to operate in the regenerative state based, at least in part, on whether the difference between the predetermined target SOC and the current SOC of the energy storage system is greater than the first predetermined threshold.

* * * * *